United States Patent [19]
Norberg

[11] 3,971,451
[45] July 27, 1976

[54] METHOD AND APPARATUS FOR INDICATING A LOAD PLACED ON A LOAD-CARRYING VEHICLE PLATFORM

[76] Inventor: Carl Eric Bertil Norberg, Satunavagen 24 D, 195 00 Marsta, Sweden

[22] Filed: July 14, 1975
[21] Appl. No.: 595,576

[30] Foreign Application Priority Data
Oct. 1, 1974 Sweden............................ 7404903

[52] U.S. Cl................................... 177/1; 177/136; 177/145; 214/2
[51] Int. Cl.².................... B60P 5/00; G01G 19/08
[58] Field of Search........... 177/136, 139, 141, 145, 177/146, 1; 214/2

[56] References Cited
UNITED STATES PATENTS
2,109,460  3/1938  Brasher............................. 177/139
3,082,834  3/1963  Ellis................................ 177/211 X Primary Examiner—Joseph W. Hartary
Attorney, Agent, or Firm—Flynn & Frishauf

[57] ABSTRACT

This invention relates to a platform which can be displaced relatively to the frame side members of a load-carrying vehicle and which in the unloaded state is situated at the theoretical center of gravity of the vehicle load. A load placed on the platform results firstly in an increase in pressure in a tipping cylinder disposed at the center of gravity of the vehicle load and secondly a torque about the theoretical center of gravity of the vehicle load if the center of gravity of the load does not lie thereat. A signal proportional to such torque then controls a platform-displacing system to displace the platform towards the theoretical center of gravity of the vehicle load. The pressure rise occurring in the tipping cylinder forms an indication of the weight of the load and can then be noted and recorded.

13 Claims, 2 Drawing Figures

METHOD AND APPARATUS FOR INDICATING A LOAD PLACED ON A LOAD-CARRYING VEHICLE PLATFORM

This invention relates to a method and apparatus for indicating a load placed on a load-carrying vehicle platform, in which the supporting points connected to the lorry frame and adapted to bear the platform normally are disengaged from the platform.

BACKGROUND OF THE INVENTION

Prior art load indicators operate in various ways, for instance by measuring shearing stresses in axle journals or loading between springs and axles, or by sensing deflection in the springs, etc. Another prior art method of measuring a load placed on a vehicle platform is to sense the hydraulic or pneumatic pressure in the platform tipping cylinder when it has been slightly lifted so that the platform substantially rests on the cylinder. The latter method is relatively cheap to perform but has a number of disadvantages: for instance, it fails to provide any direct and reliable indication of the load placed on the platform, inter alia because it is impossible to be certain at what point on the platform its center of gravity is concentrated.

The main object of the present invention is to provide a method of indicating the weight of a load placed on a vehicle and also to provide a method which can be used when the object is to maximize the vehicle payload, measure the axle pressure and/or bogie pressure respectively and determine the redistribution of the weight of the load on the vehicle axles in relation to, for instance, the permissible axle pressure.

SUMMARY OF THE INVENTION

The method according to the present invention is characterized in that the platform of the vehicle is brought into contact with a balancing member disposed at the theoretical center of gravity of the vehicle load and with a first transmitter which is spaced from the balancing member and is adapted to deliver a signal proportional to the sensed torque about the balancing member, such signal being adapted to control a platform-displacing system to displace the platform, and therefore the center of gravity of the load placed thereon, towards and preferably so as to coincide with the theroretical center of gravity of the vehicle load.

An apparatus according to the present invention for carrying out the method is characterized by: a balancing member disposed at the theoretical center of gravity of the vehicle load and adapted to relieve some of the vehicle platform's normal supporting points during indication; a first transmitter which is spaced from the balancing member and is adapted to relieve the vehicle platform's other normal supporting points during indication and deliver a signal proportional to the sensed torque about the balancing member; and a platform-displacing system which is adapted to displace the platform, and therefore the center of gravity of the load placed thereon, towards and preferably so as to coincide with the theoretical center of gravity of the vehicle load responsive to such signal.

In a preferred embodiment the balancing member is constructed in the form of a tipping system adapted on the one hand to tip the load and on the other to sense the weight of the load placed on the platform.

DETAILED DESCRIPTION

Figure 1:
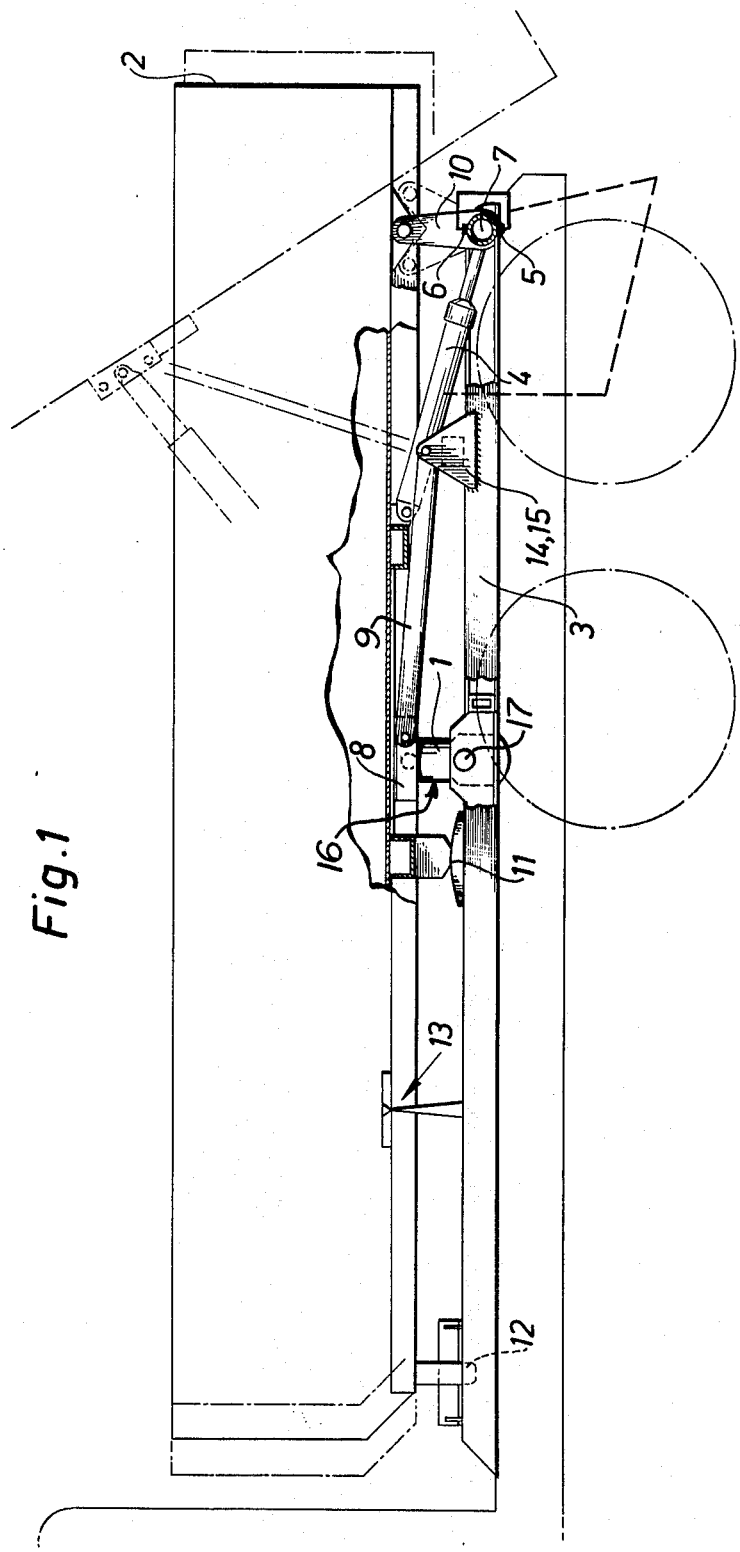
FIG. 1 is a side elevation of a vehicle platform.
Figure 2:
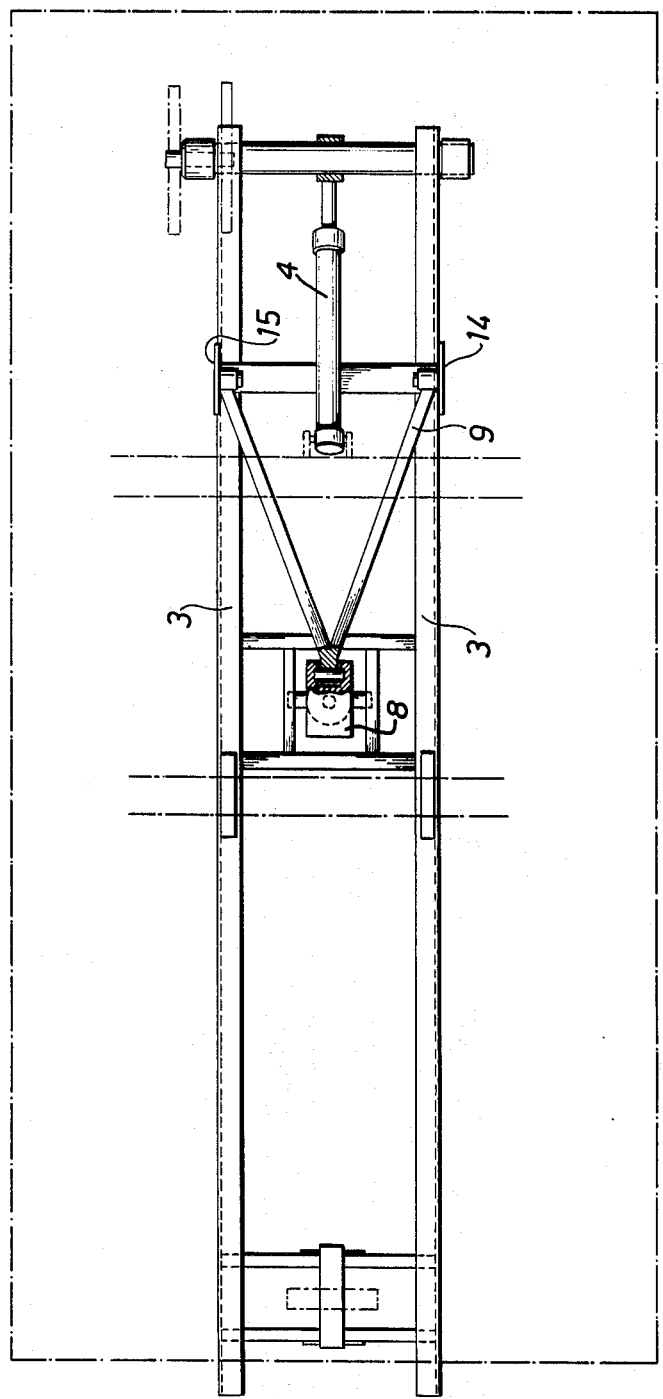
FIG. 2 is a plan view of the vehicle with the platform removed.

A platform 2 rests slidably on the upper member 8 of a balancing member 16. The balancing member 16 comprises a hydraulic or pneumatic tipping cylinder 1 whose lower end is pivotably attached between the vehicle frame side members 3 by means of a pivot 17. The rear portion of the platform 2 is also articulated via a link 10 to a tipping pivot 7 around which the platform 2 is adapted to pivot during tipping, during which the link 10 occupies the position shown by solid lines in FIG. 1 and is fixed in that position by a method not shown in detail. When tipping does not take place, the link 10 is articulated to both the platform 2 and the tipping pivot 7. Normally the platform 2 rests on at least two other platform supports 11, 12. The platform 2 and the frame side member 3 can also have a suitable indicator unit 13 to indicate the position of the platform 2 relative to the frame of the vehicle and whose function will be described hereinafter in greater detail.

Two sensing members in the form of, for instance, strain gauge transmitters 5, 6 are conveniently disposed, for example glued, centrally on the top and bottom respectively of the tipping pivot 7, or at any other suitable measuring place on the vehicle. A hydraulic or pneumatic actuator 4 whose piston is articulated to the tipping pivot 7 and whose cylinder is articulated to the platform 2 is disposed between the platform 2 and the tipping pivot 7.

The balancing member 16 is disposed at the theoretical center of gravity of the vehicle load.

The apparatus operates as follows: When a load is applied which is to be indicated, the tipping cylinder 1 is raised slightly, so that the platform 2 is no longer supported on the supports 11, 12.

Alternatively, instead of raising the tipping cylinder 1, the members 11, 12 normally bearing the platform can be lowered, so that the platform rests on the balancing member 16 and the transmitters 5, 6 spaced therefrom. This alternative, therefore, requires no tipping system or tipping pivot 7, but merely a fixed balancing member (not shown in detail) and the transmitters 5, 6 attached to the vehicle frame side member 3 at a distance from the balancing member.

In the first-mentioned instance, which corresponds to the drawings the platform 2 rests partly on the tipping cylinder 1 and partly via the link 10 on the tipping pivot 7. The platform 2 is conveniently so arranged relative to the location of the tipping cylinder 1 that in the unloaded state the platform 2 balances on the balancing member 16. When a load is applied to the platform 2 the pressure in the cylinder arrangement 1 rises. Such a pressure rise is therefore itself an indication of the weight of the load placed on the platform 2. In this way a direct indication is obtained corresponding to the weight of the load that has been added to the platform 2. If the load is placed at a slight obliquity to the balancing member 16, an imbalance is obtained in the system by means of which a torque is produced in the tipping pivot 7 via the link 10. The torque is sensed by the strain gauge transmitters 5, 6 which produce a signal proportional to the sensed torque, such signal controlling the hydraulic or pneumatic cylinder arrangement 4, which displaces the platform 2 towards the balance of the platform 2 over the tipping system - i.e. in inverse relationship to the point where the load is placed on the platform 2. In the embodiment illustrated, the length of stroke of the platform 2 is 300 mm, so that the platform can be displaced within this limit, although of course the length of stroke can be made to vary within substantially wider limits if necessary. The platform 2 consequently moves in inverse relationship to the point where the load is placed on the platform, so that for each component of the load a displacement is obtained in the direction of counterbalancing the system. During the course of loading, therefore, the weight added to the platform can be observed in each case, and the total weight of the load can also be noted and recorded in a manner not shown in detail. The indicator 13 indicates the position of the platform 2 relative to the vehicle frame and also gives the driver or loader the necessary information as to where he must place the load on the vehicle to keep within the given stroke length, thus ensuring efficient measurement during loading.

Since the balancing member 16 is disposed at the theoretical center of gravity of the vehicle load, there is also the advantage that the extra pressure occurring due to the rear or bogie axles respectively can be calculated in a very simple manner, so that the axle pressures can be correctly adapted to those permissible for the lorry and the road over which it travels.

In the alternative instance indicated hereinbefore, the balancing member 16 is conveniently constructed in the form of a transmitter which senses the weight which the platform and the load placed thereon exert on the transmitter.

In the system illustrated in the drawings, when loading has been completed, the tipping system is again lowered, so that the platform 2 rests on both the tipping pivot 7 and the platform supports 11, 12, whereafter the load can be transported in the usual manner.

During the tipping of the load, the tipping system is actuated in the normal manner, and the link 10 is preferably fixed in the vertical position, as shown in solid lines in FIG. 1. To increase the lateral stability of the platform 2 during tipping, the upper member 8 of the tipping system 16 is articulated to a V-shaped stabilizer 9 whose ends are articulated to the frame side members 3 via flanges 14, 15 welded thereto. During tipping, the upper member 8 of the tipping system 16 is allowed to move along the underside of the platform 2.

In addition to using the pressure in the tipping system, the added loads and total load can also be sensed by transmitters disposed between the tipping system and the frame side members or between the tipping system and the platform, although these embodiments are not shown in the drawings.

The main advantage of the apparatus according to the present invention is that it allows the displacement of the center of gravity of the load placed on the platform. The displaceable platform affords a shorter overhang, which can readily be adjusted in the rearward direction if required during tipping.

The lorry load capacity can be maximized in each individual case, since the center of gravity of the load can be displaced towards and preferably so as to coincide with the theoretical center of gravity of the lorry load. Individual adaptation to the permissible axle pressure and bogie pressure for the vehicle or the road over which it travels is thus readily possible.

Possible tendencies of some lorries to become lighter at the front and therefore less steerable during, for instance, the spreading of sand, can be reduced or obviated by displacing the platform towards the driver's cab.

The embodiment as illustrated does not show details such as electric cables or pressure lines extending to the driver's cab. Further, the weight indicator can also be arranged to show the axle pressure or bogie pressure caused by the load.

What I claim is:

1. A method for indicating a load based on a vehicle platform which is supported on a vehicle, comprising:
   providing a balancing member (16) on the vehicle and disposed at the theoretical center of gravity of the vehicle load;
   relieving at least a portion of the vehicle platforms normal supporting points during load indication by means of said balancing member (16);
   providing a first sensing and transmitting means (5, 6) spaced from said balancing member (16);
   relieving the vehicle platforms other normal supporting points during load indication by means of said first sensing and transmitting means (5, 6);
   sensing, by means of said first sensing and transmitting means (5, 6), a torque about said balancing member (16) caused by application of a load on the vehicle platform (2) and delivering a signal which is a function of said sensed torque; and
   displacing said platform (2) and therefore the center of gravity of the load placed thereon, as a function of said signal, towards and so as to substantially coincide with the theoretical center of gravity of the vehicle load on the vehicle platform (2).

2. Apparatus for indicating a load placed on a vehicle platform (2) which is supported on a vehicle, comprising:
   a balancing member (16) mounted to the vehicle and disposed at the theoretical center of gravity of the vehicle load and adapted to relieve at least a portion of the vehicle platform's normal supporting points during load indication;
   a first sensing and transmitting means (5, 6) spaced from said balancing member (16) and adapted to relieve the vehicle platform's other normal supporting points during load indication, said first sensing and transmitting means (5, 6) sensing a torque about said balancing member (16) caused by application of a load on the vehicle platform (2) and delivering a signal which is a function of said sensed torque; and
   a platform-displacing system (4) coupled to said platform (2) and to said first sensing and transmitting means (5, 6) to displace said platform (2) and therefore the center of gravity of the load placed thereon, towards and so as to substantially coincide with the theoretical center of gravity of the vehicle load responsive to said signal.

3. Apparatus according to claim 2 wherein said vehicle includes a frame (3) and wherein said balancing member (16) comprises a tipping system (1) disposed between said vehicle platform (2) and frame (3), said tipping system (1) including means for sensing the weight of the load placed on said platform (2).

4. Apparatus according to claim 3 wherein said weight sensing means of said tipping system (1) includes a second transmitting means disposed between said tipping system (1) and at least one of the vehicle frame (3) and vehicle platform (2).

5. Apparatus according to claim 3 wherein said platform-displacing system comprises a pneumatic or hydraulic cylinder arrangement (4), one end of which is articulated to the vehicle frame (3) and the other end of which is articulated to said platform (2).

6. Apparatus according to claim 5 wherein the moveable end of said cylinder arrangement (4) is articulated to said platform (2).

7. Apparatus according to claim 2 wherein said vehicle includes a frame (3) and wherein said platform-displacing system comprises a pneumatic or hydraulic cylinder arrangement (4), one end of which is articulated to the vehicle frame (3) and the other end of which is articulated to said platform (2).

8. Apparatus according to claim 7 wherein the moveable end of said cylinder arrangement (4) is articulated to said platform (2).

9. Apparatus according to claim 2 comprising a tipping pivot (7) spaced from said balancing member (16) and pivotally coupling said platform (2) on the vehicle, and wherein said first sensing and transmitting means comprises two transmitters (5, 6) coupled to said vehicle tipping pivot (7) for sensing said torque.

10. Apparatus according to claim 9 wherein said two transmitters (5, 6) are disposed substantially centrally on the top and bottom, respectively, of said vehicle tipping pivot (7).

11. Apparatus according to claim 3 wherein said tipping system includes a member (8) cooperatively coupled with said platform (2) and a substantially V-shaped stabilizer member (9) whose apex is pivotally mounted to said member (8) and the arms of which are pivotally mounted to said frame (3), said stabilizer member (9) controlling said tipping member (8).

12. Apparatus according to claim 11 comprising a vehicle tipping pivot (7) coupled to said platform (2) via a link (10) articulated to said platform (2) and the tipping pivot (7) for pivotally mounting said platform (2) on the vehicle.

13. Apparatus according to claim 9 wherein said vehicle tipping pivot (7) is connected to said platform (2) via a link (10) articulated to said platform (2) and said tipping pivot (7).

* * * * *